United States Patent
Doane et al.

[11] Patent Number: 6,104,448
[45] Date of Patent: Aug. 15, 2000

[54] PRESSURE SENSITIVE LIQUID CRYSTALLINE LIGHT MODULATING DEVICE AND MATERIAL

[75] Inventors: J. William Doane, Kent; Deng-Ke Yang, Hudson; Liang-Chy Chien, Stow, all of Ohio

[73] Assignee: Kent State University, Kent, Ohio

[21] Appl. No.: 09/465,192

[22] Filed: Dec. 15, 1999

Related U.S. Application Data

[63] Continuation of application No. 08/755,494, Nov. 22, 1996, abandoned, which is a continuation-in-part of application No. 07/694,840, May 2, 1991, abandoned.

[51] Int. Cl.[7] ............................. G02F 1/137; C09K 19/02
[52] U.S. Cl. ........................... 349/12; 349/169; 349/23; 349/25; 349/86; 349/176
[58] Field of Search ................................. 349/12, 169, 20, 349/25, 23, 86, 176, 115, 158

[56] References Cited

U.S. PATENT DOCUMENTS

| | | | |
|---|---|---|---|
| 5,493,430 | 2/1996 | Lu et al. | 349/106 |
| 5,691,795 | 11/1997 | Doane et al. | 349/169 |
| 5,729,320 | 3/1998 | Eidenschink et al. | 349/23 |
| 5,847,798 | 12/1998 | Yang et al. | 349/88 |

OTHER PUBLICATIONS

West et al. "Flexible Displays Utilizing Bistable, Reflective Cholestericy Polymer Dispersions and Polyester Substrates" Asia Display 95—pp. 55–57—Oct. 1995.

*Primary Examiner*—James A. Dudek
*Assistant Examiner*—Tai V. Duong
*Attorney, Agent, or Firm*—Renner, Kenner, Greive, Bobak, Taylor & Weber

[57] ABSTRACT

A new liquid crystalline light modulating cell and material are characterized by liquid crystalline light modulating material of liquid crystal and polymer, the liquid crystal being a chiral nematic liquid crystal having positive dielectric anisotropy and including chiral material in an amount effective to form focal conic and twisted planar textures, the polymer being distributed in phase separated domains in the liquid crystal cell in an amount that permits the liquid crystal to change textures upon the application of a field and ruggedizes the structure. In still another embodiment, the material exhibits stability at zero field in a colored, light reflecting state, a light scattering state and multiple stable reflecting state therebetween, as well as being optically clear in the presence of a field. In yet another embodiment, the application of mechanical force to the cell changes the material from an optically clear state to a light reflecting state.

4 Claims, 3 Drawing Sheets

PRESSURE SENSITIVE LIQUID CRYSTALLINE LIGHT MODULATING DEVICE AND MATERIAL

RELATED APPLICATIONS

This application is a continuation of U.S. application Ser. No. 08/755,494, filed Nov. 22, 1996, now abandoned, which is a continuation in part of U.S. Ser. No. 07/694,840, filed May 2, 1991, abandoned and incorporated herein by reference, U.S. Ser. No. 07/885,154, filed May 18, 1992, U.S. Pat. No. 5,304,067, incorporated herein by reference, and U.S. Ser. No. 08/425,289, filed Apr. 20, 1995, now U.S. Pat. No. 5,691,795, incorporated herein by reference.

This application was made in part with Government support under cooperative agreement number DMR 89-20147 awarded by the National Science Foundation. The Government has certain rights in this invention.

BACKGROUND OF THE INVENTION

1. Technical Field

The present invention relates generally to liquid crystalline light modulating devices, and more specifically to new phase-separated polymeric-liquid crystalline display cells and materials which exhibit different optical states under different electrical field or mechanical stress conditions and are characterized by a unique combination of properties, including optical multistability and haze-free light transmission at all viewing angles in either a field-ON or field-OFF mode.

2. Description of the Related Art

Electrically switchable liquid crystal-polymer films intended for use in various electro-optical devices have been prepared by mechanical entrapment procedures. One such technique involves imbibing liquid crystal into micropores of a plastic or glass sheet. Another technique involves evaporation of water from an aqueous emulsion of nematic liquid crystal in a solution of water-soluble polymer such as polyvinyl alcohol or in a latex emulsion.

A different procedure offering significant advantages over mechanical entrapment techniques and the emulsification procedure involves phase separation of nematic liquid crystal from a homogeneous solution with a suitable synthetic resin to form a liquid crystal phase dispersed with a polymer phase. The resulting materials are referred to as polymer dispersed liquid crystal (PDLC) films. Some of the advantages of PDLC films are discussed in U.S. Pat. Nos. 4,671,618; 4,673,255; 4,685,771; and 4,788,990; the disclosures of which are incorporated by reference. PDLC films have been shown to be useful in many applications ranging from large area displays and switchable coatings for windows to projection displays and high-definition television.

The methods of phase separation can be carried out by polymerization initiated by addition of a curing agent, by ultraviolet light or by cooling into the region of immiscibility. Another method is evaporating a solvent from a matrix-producing composition of a solution of polymer and liquid crystal in the solvent.

In windows or displays as described above in which the ordinary index of refraction of the liquid crystal is matched to the refractive index of the polymer, the device appears most transparent (field-ON-state) when viewed along the direction of the field which is usually normal to the viewing surface. Transparency decreases giving rise to increasing "haze" at increasing oblique viewing angles until an essentially opaque appearance is detected at an oblique enough angle. This condition of haze results from the fact that the farther the viewing angle is from the orthogonal, the greater is the perceived mismatch between the effective index of refraction of the liquid crystal and the refractive index of the matrix.

A further development of PDLC films disclosed in U.S. patent application Ser. No. 07/324,051, now U.S. Pat. No. 4,994,204, issued Feb. 19, 1991, involves the use of a birefringent polymer, e.g., a liquid crystal polymer. The PDLC film prepared with the birefringent polymer has the characteristic of displaying haze-free transparency for all directions of incident light. This is accomplished by matching the ordinary and extraordinary indices of refraction of the polymer to the ordinary and extraordinary indices of refraction of the liquid crystal.

PDLC films made with birefringent polymer can operate in the normal manner so that they are clear in a field-ON state and light scattering in a field-OFF state. Alternatively, the films can be made to operate in a reverse or "fail-safe" mode such that the material is clear in the absence of a field and is light scattering in the field-ON state.

It is also known to provide liquid crystal displays wherein a pen or stylus is used to change liquid crystal material from a planar state to a focal conic state or vice versa. These pen-based displays are employed as reusable, erasable writing tablets in such applications as children's toys and in portable electronic devices. As disclosed in U.S. Pat. No. 4,525,032, which is incorporated by reference, these devices employ cholesteric or smectic liquid crystal material that is changeable between states by the application of pressure, heat, light or an electric field. The writing on these tablets may then be erased by flexing the display, by applying an electric field or by exposing the material to an appropriate heating or cooling temperature.

DISCLOSURE OF THE INVENTION

The invention is an electrically switchable material which can be prepared so that it exhibits multiple optically different states, all of which are stable in the absence of an applied field. When incorporated in a display device, the material can be driven from one state to another by an electric field. Depending upon the magnitude and shape of the electric field pulse, the optical state of the material can be changed to a new stable state which reflects any desired intensity of colored light along a continuum of such states, thus providing a stable "grey scale." A low electric field pulse results in a light scattering state which is weakly scattering. The application of a sufficiently high electric field pulse, i.e., an electric field high enough to homeotropically align the liquid crystal directors, drives the material to a light reflecting state that can be any desired color. The weakly light scattering and light reflecting states remain stable at zero field. If a sufficiently high electric field is maintained, the material is transparent until the field is removed. When the field is turned off quickly, the material reforms to the light reflecting state. When a lower field is applied, the material reforms to the weakly light scattering state. Electric field pulses of various magnitudes below that necessary to drive the material to the stable reflecting state or to the stable weakly scattering state will drive the material to intermediate states that are themselves stable. These multiple stable states indefinitely reflect colored light of an intensity between that reflected by the reflecting and scattering states. Thus, depending upon the magnitude of the electric field pulse the material exhibits stable grey scale reflectivity. Application of mechanical stress to the material can also be used to drive the material from the light scattering to the light reflecting state.

A major advantage of the multistable material is that it does not require an active matrix to make a high-definition flat panel screen. The screen can be prepared without active elements at each pixel site and a multiplexing scheme used to address the display. This greatly simplifies production, increases yield and reduces the cost of the display.

Multiplexed flat panel liquid crystal displays are not new and have been developed primarily with super twisted nematic materials for applications such as lap-top computer screens. Ferroelectric liquid crystals, which exhibit a surface stabilized bistable state, also can be multiplexed. These displays have been difficult to commercialize because the surface stabilization is not maintained under severe operating conditions. The material of the present invention provides several advantages in that the weakly light scattering and light reflecting states are stable without requiring delicate surface conditions of the substrate. Display devices made with the material of the invention do not require polarizers which limit the brightness of the displays. Furthermore, color is introduced by the material itself without the need of color filters which also can reduce brightness.

Still another important feature of the invention is that the liquid crystal material may be prepared so that the application of mechanical stress drives the material from the light scattering state to the light reflecting state. This is achieved by employing a bistable, reflective polymer/cholesteric formulation that exists in one of two stable states; a highly reflecting planar state and a weakly light scattering, relatively transparent focal conic state. This material may also be switched to one of these two states by a sufficient magnitude electric field for erasure. When an appropriate magnitude electric field is applied, the helical axes of the liquid crystal material are placed at random angles to the surface of the display cell. The material remains in this relatively transparent state even after removal of the electric field. When pressure is applied to the material, the helical axes become aligned essentially orthogonally to the surface of the cell to reflect light. A high resolution display is thus obtained. It will be appreciated that bistability may be achieved without polymer networks. The polymer network functions to cellularize the liquid crystal material, adhere the two substrates to one another and ruggedizes the display.

The advantageous properties described above are achieved in the invention by providing a light modulating cell comprising a liquid crystalline light modulating material of liquid crystal having positive dielectric anisotropy and including chiral material in an amount effective to form focal conic and twisted planar textures. A polymer is distributed in phase separated domains in the cell in an amount to control the thickness of the display, maintain stability of the focal conic and twisted planar textures in the absence of a field and permits the liquid crystal to change textures upon the application of a field.

The addressing means can be of any type known in the art, such as an active matrix, a multiplexing circuit, electrodes, etc. The new material can be made to exhibit different optical states, i.e., light transmitting, light scattering, light reflecting and stable grey scale in between these states, under different field conditions.

The material used to form the polymer networks is soluble with the chiral nematic liquid crystal and phase separates to form separated polymer domains. Suitable polymer materials may be selected from U.V. curable, thermoplastic and thermosetting polymers, including polymers formed from monomers, polymethylmethacrylates, bisacrylates, hydroxyfunctionalized polymethacrylates and epoxy systems to name a few. The amount of polymer to be used depends upon the polymer. Useful results have been obtained with polymer contents ranging from about 1.5 to about 40% depending upon the polymer. For pressure sensitive display units it has been found that optimal results are obtained when the polymer content of the liquid crystal material ranges from about 10 to about 30%.

The chiral nematic liquid crystal is a mixture of nematic liquid crystal having positive dielectric anisotropy and chiral material in an amount sufficient to produce a desired pitch length. Suitable nematic liquid crystals and chiral materials are commercially available and would be known to those of ordinary skill in the art in view of this disclosure. The amount of nematic liquid crystal and chiral material will vary depending upon the particular liquid crystal and chiral material used, as well as the desired mode of operation. For multistable cells, useful results have been obtained using from about 18 to about 66% by weight chiral material based on the combined weight of chiral material and nematic liquid crystal. For pressure sensitive displays, optimal results have been obtained using from about 32 to about 52% by weight chiral material based on the combined weight of chiral material and nematic liquid crystal.

The wavelength of the light that is reflected by the material is given by the relation $\lambda = np$, where n is the average refractive index and p is the pitch length. Wavelengths above 800 nm are in the infra-red and those below 380 nm are in the ultra violet.

In carrying out the invention, the solution of liquid crystal and polymer (or polymer precursor) is introduced into a cell. Polymerization is initiated in any suitable manner, as by UV radiation, thermally etc., depending upon the polymer used. Under polymerization conditions, the polymer phase separates from the chiral nematic liquid crystal and forms phase separated polymer domains of polymer molecules.

The multistable color display cells are prepared by polymerizing and/or phase separating the liquid crystal-polymer solution either in zero field or in a field effective to align the liquid crystal directors. In the field-OFF condition with the liquid crystal molecules in a twisted planar texture essentially parallel to the cell walls, the cell is in a colored light reflecting state. This state can be made to appear as green, red, blue, or any pre-selected color depending upon the pitch length of the chiral nematic liquid crystal. When a low electric field, e.g. 6 volts per micron of thickness, is applied to the cell, it will switch to a weakly scattering, relatively transparent state. In this state, the liquid crystal molecules surrounding the polymer domains have a focal conic texture as a result of the competition of any surface effects, the electric field and the constraint of the polymer domains. The material will remain in the relatively transparent state when the low electric field is removed. If a higher electric field, e.g. 12 volts per micron of thickness, is applied to the cell, the material becomes optically clear until the voltage is removed. If the electric field is turned off quickly, the material switches to the uniform twisted planar structure which has the preselected color dictated by the pitch length. The light reflecting state remains stable at zero field condition. If a lower field is applied, the material changes to its weakly light scattering, relatively transparent state which also remains stable at zero field condition. The magnitude of the field necessary to drive the material between various states will, of course, vary depending upon the nature and amount of the particular liquid crystal and polymer used, but could be easily determined by one of ordinary skill in the art in view of the instant disclosure.

In the multistable color displays the chiral nematic liquid crystal has a pitch length in a preferred range of from about 0.25 to 0.44 microns effective to reflect circularly polarized visible light. Typical pitch lengths are 0.27 microns for blue color, 0.31 microns for green color and 0.40 microns for red color. Multistable color display materials have been prepared containing from about 27 to about 66% chiral material based on the combined weight of nematic liquid crystal and chiral material. The ranges can vary, however, depending upon the chiral material, liquid crystal and the polymer used.

The multistable display materials can be prepared to function as a bistable light shutter. By adjusting the pitch length of the chiral nematic liquid crystal to reflect light in the ultra violet range, the material will appear clear when switched to the stable planar texture because the reflected light is outside the visible spectrum. As with the color reflecting cells, the material will scatter light when switched to the stable focal conic texture. Hence, the multistable material can be switched between a stable optically clear state, where the liquid crystal reflects light in the ultra violet range, and a stable light scattering state. Pitch lengths effective to reflect light in the ultra violet range will typically be from about 0.5 to about 1 micron. Bistable light shutters that reflect light in the ultra violet, and hence appear clear in the planar texture, and scatter light in the focal conic texture have been prepared containing about 18% by weight chiral material based on the combined weight of chiral material and nematic liquid crystal.

Surprisingly, the multistable color reflecting material exhibits a stable grey scale, i.e., multiple optical states characterized by varying degrees of intensity of reflection, all of which are stable in the absence of an applied field. In between the reflecting and scattering states the material exhibits stable grey scale reflectance of the colored light depending upon the voltage of the electric field addressing pulse. In each case, the electric field pulse is preferably an AC pulse, and more preferably a square AC pulse, since a DC pulse will tend to cause ionic conduction and limit the life of the cell.

Accordingly, the invention also features a method of addressing a polymer stabilized chiral nematic liquid crystal material capable of being switched between a color reflecting state that reflects a maximum reference intensity, and a light scattering state exhibiting a minimum reference intensity. The method comprises applying voltage pulses of varying magnitude sufficient to achieve stable color reflectivity between said maximum and minimum, thereby producing stable grey scale reflectance from the material.

Preferably the method is characterized by subjecting the material to an AC pulse of sufficient duration and voltage to cause a proportion of said chiral nematic material to exhibit a first optical state and the remaining proportion of the chiral nematic material to exhibit a second optical state that is different than the first state. In the preferred embodiment, the proportion of the material in the first optical state exhibits the planar texture and the remainder of the material in the second optical state exhibits the focal conic texture, the intensity of reflection being proportional to the amount of the material in the planar reflecting texture.

The foregoing and other aspects of the invention which will become apparent as the detailed description proceeds are achieved by a pressure sensitive writing tablet, comprising a liquid crystal material interspersed with polymer and disposed between two opposed substrates; and a surface on at least one of the two opposed substrates for receiving a supplied pressure force for converting the liquid crystal material adjacent thereto from a first optical state to a second optical state.

Yet another aspect of the present invention is attained by a pressure sensitive cell, comprising liquid crystalline light modulating material of liquid crystal and polymer, the liquid crystal being a nematic liquid crystal having positive dielectric anisotropy and including chiral material in an amount effective to form a focal conic texture and a planar texture having a pitch length that reflects light in the visible spectrum, the polymer being distributed in phase separated domains in the cell in an amount that stabilizes the thickness and structure thereof, wherein in the application of a mechanical force to the cell changes an initial texture selected from one of the focal conic and the planar textures to an altered other texture of the focal conic and the planar textures.

Still another aspect of the present invention is attained by a pressure sensitive writing tablet comprising a liquid crystal material disposed between two opposed substrates, the material having a polymeric agent therein to form a plurality of enclosed cell walls, wherein application of an electric field across the substrates places the liquid crystal material in a substantially transparent focal conic state; and a surface on at least one of the two opposed substrates for receiving an applied pressure force for converting the liquid crystal material within at least one enclosed cell wall adjacent the mechanical force from the substantially transparent focal conic state to a substantially light reflecting planar state.

Many additional features, advantages and a fuller understanding of the invention will be had from the following detailed description of preferred embodiments and the accompanying drawings.

DESCRIPTION OF PREFERRED EMBODIMENTS

Figure 1:
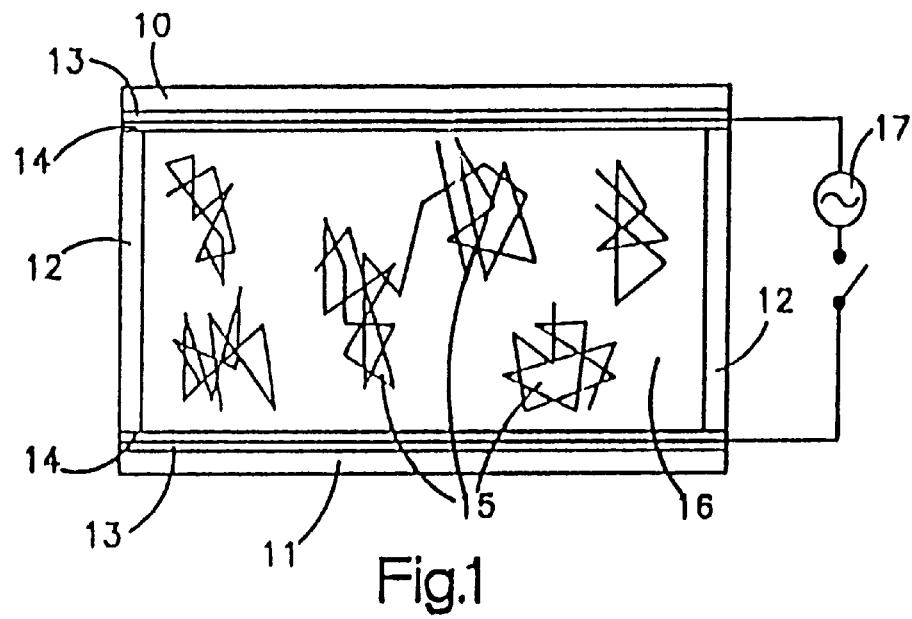
FIG. 1 is a diagrammatic, cross-sectional illustration of a light modulating cell incorporating the polymer-liquid crystalline material of the invention.

The diagrammatically illustrated cell in FIG. 1 comprises glass plates 10 and 11 which are sealed around their edges and separated by spacers 12. As shown, the glass plates 10 and 11 are coated with indium-tin oxide or the like to form transparent electrodes 13. The reference character 14 represents an optional rubbed polyimide coating which can be applied to the electrodes in order to affect homogeneous surface alignment of the liquid crystal directors.

The cell of FIG. 1 is filled with the polymer-liquid crystalline material of the invention. The liquid crystalline light modulating material is generally comprised of phase-separated polymer domains 15 dispersed in surrounding chiral nematic liquid crystal 16 having positive dielectric anisotropy. An AC voltage source 17 is shown connected to the electrodes 13 in order to switch the cell between different optical states.

It is to be understood that the form of the cell depicted in FIG. 1 has been chosen only for the purpose of describing a particular embodiment and function of the liquid crystalline light modulating material of the invention, and that the material can be addressed in various ways and incorporated in other types of cells. For example, instead of being addressed by externally activated electrodes, the new material can be addressed by an active matrix, a multiplexing scheme or other type of circuitry, all of which will be evident to those working in the art. Similarly, the cells can be prepared without the optional alignment layers.

In accordance with the invention, the polymer domains 15 are defined by polymer which is phase separated from a solution with the chiral nematic liquid crystal.

The polymer content in terms of weight based on the combined weight of chiral nematic liquid crystal and polymer will vary depending upon the polymer used, and is preferably present in an amount ranging from about 1.5 to about 40% by weight based on the combined weight of polymer and liquid crystal. For example, cells have been prepared with a polymer content ranging from about 1.5% to 10% using certain bisacrylates, from about 10 to 40% when using hydroxy functionalized polymethacrylates, epoxies, thermoplastics and U.V. cured polymers. It is to be understood, therefore, that the polymer content is subject to some variation, in as much as what constitutes a desirable or undesirable appearance of the cell in its various optical states is a matter of subjective judgment.

In a preferred manner of preparing the cell shown in FIG. 1, the polymer (or its precursors, e.g. monomers) is dissolved with the chiral nematic liquid crystal together with any necessary photo-initiator, cross-linking or curing agent. The solution is then introduced between the glass plates 10 and 11 shown here having the optional rubbed polyimide coatings 14. The solution is then polymerized in situ to induce concomitant phase separation of the polymer to form the polymer domains in the cell, conceptually illustrated by reference character 15. The polymerization of the polymer-liquid crystal solution can take place either in the presence of an electric field effective to homeotropically align the liquid crystal directors or in a zero field. In the latter case, the liquid crystal molecules will prefer a twisted planar texture oriented parallel to the cell walls.

Multistable Color Display Cells

The multistable color display material of the invention exhibits a stable grey scale phenomenon characterized by the ability of the material to reflect indefinitely any selected intensity of light between the intensity reflected by the reflecting state and that reflected by the scattering state. When the material is in the reflecting state, the chiral material assumes a planar texture which reflects colored light at a maximum intensity for a given material, the color of the reflected light being determined by the pitch length of the chiral material. An electric field pulse of an appropriate threshold voltage, typically in the range of about 4 to 5 volts per micrometer of thickness, will cause at least a portion of the material to change its optical state and the intensity of reflectivity to decrease. If the AC pulse is high enough, e.g., in the range of about 6 to 8 volts per micrometer of thickness, the optical state of the material will change completely to the scattering state in which the chiral material exhibits a focal conic texture which reflects light at a minimum intensity for a given material. In between the reflecting state, which for a given material can be considered to define the maximum intensity of reflectivity for that material, and the scattering state, which can be considered to define the minimum intensity of reflectivity, the intensity of reflectivity ranges along a grey scale, which is simply a continuum of intensity values between that exhibited by the reflecting and scattering states.

While not wanting to be bound by theory, it has been observed that the intensity of reflectivity along the grey scale is approximately linearly proportional to the voltage of the pulse. By varying the voltage of the pulse, the intensity of reflectivity of a given color can be varied proportionally. When the electric field is removed, the material will reflect that intensity indefinitely. It is believed that pulses within this grey scale voltage range cause a proportion of the material to convert from the planar texture characteristic of the reflecting state, to the focal conic texture characteristic of the scattering state or vice versa. Since both the planar texture of the reflecting state and the focal conic texture of the scattering state are stable in the zero field condition, the grey scale intensities reflected by the display are also stable since the material in these optical states simply comprises a combination of both the stable planar texture and the stable focal conic texture. The intensity of reflectivity along the grey scale is proportional to the amount of chiral material switched from the planar texture to the focal conic texture, or vice versa, which is in turn proportional to the voltage of the AC pulse.

Multistable color display cells which scatter light in one state and reflect circularly polarized colored light in another state with stable grey scale reflection therebetween, and which also can be operated to exhibit optical transparency, are made using chiral nematic liquid crystal which has a pitch length effective to reflect light in the visible spectrum. Preferred materials have a pitch length ranging from about 0.25 to about 0.44 microns. Typical pitch lengths are 0.27 microns for blue color, 0.31 microns for green colors and 0.40 microns for red color. Multistable color display materials have been prepared to contain from about 27 to about 66% chiral material based on the combined weight of nematic liquid crystal and chiral material; although, as in the case of previously described embodiments, the weight amount can vary depending upon the particular chiral material, nematic liquid crystal and polymer which are used.

Figure 2:
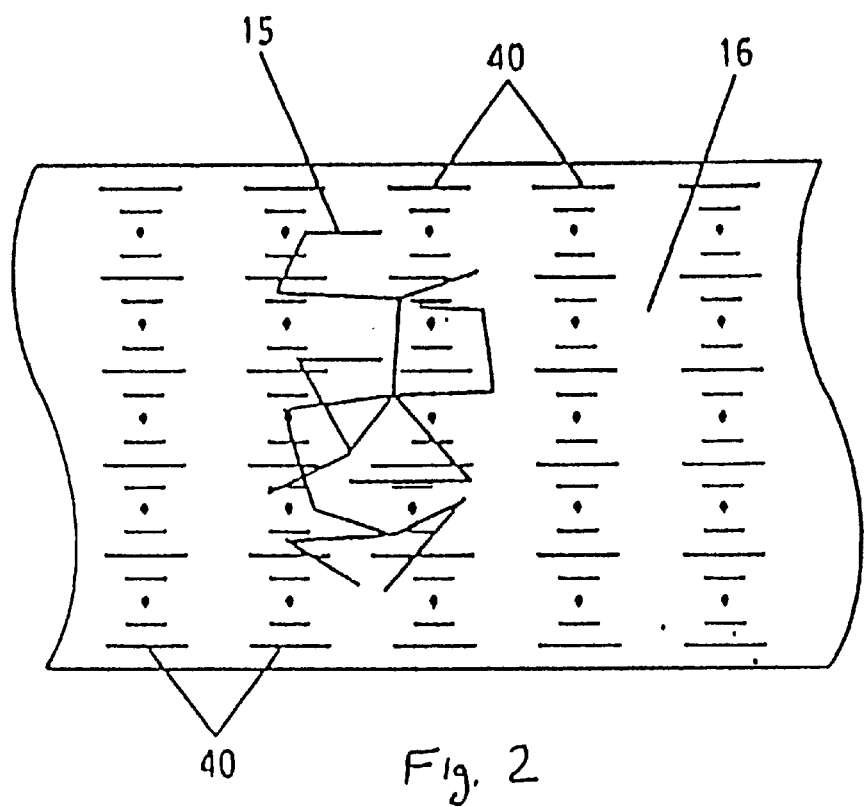
FIG. 2 is a diagrammatic, fragmentary, enlarged cross-sectional illustration of the material when the liquid crystal has a twisted planar texture.

FIG. 2 conceptually illustrates a single polymer domain 15 of the multistable color display material of the invention in its light reflecting state. In this state, the chiral liquid crystal molecules 40 are oriented in a twisted planar structure parallel to the cell walls. Because of the twisted planar texture the material will reflect light, the color of which depends upon the particular pitch length. In this stable reflecting state, the material exhibits maximum reflectivity that constitutes a maximum reference intensity below which the grey scale intensities are observed.

Figure 3:
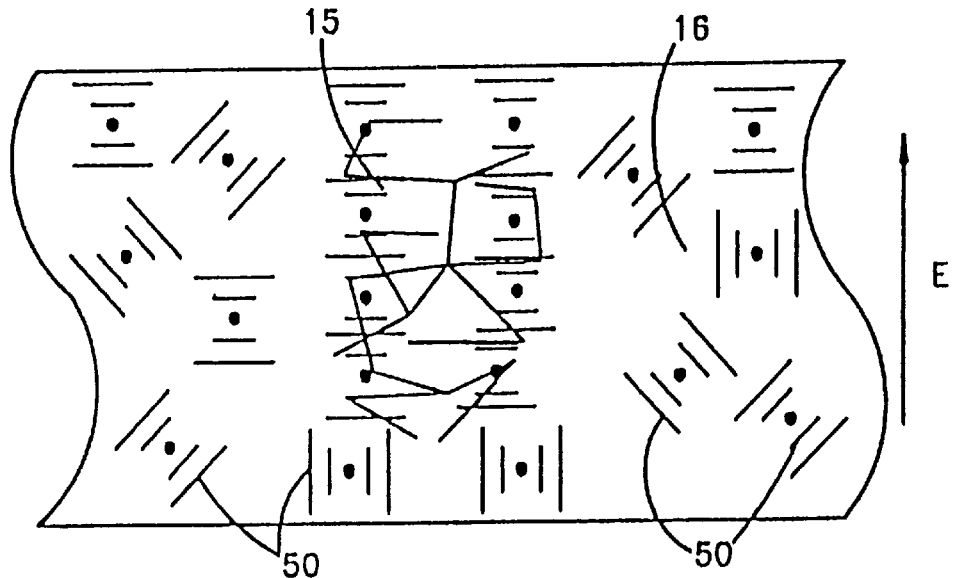
FIG. 3 is a diagrammatic, fragmentary, enlarged cross-sectional illustration of the material wherein the liquid crystal in proximity to the polymer domains has a twisted planar structure, while the surrounding liquid crystal has a focal conic texture.

The liquid crystal indicated by reference numeral 50 in FIG. 3, reforms to the focal conic texture when an AC voltage pulse of appropriate magnitude is applied to the cell. As conceptually illustrated in FIG. 3, the multistable color display material is in its light scattering state. In this stable scattering state the material exhibits its minimum intensity of reflection (i.e., maximum scattering) which defines a minimum reference intensity of reflectivity above which the grey scale intensities are observed.

If the pitch length of the polymer stabilized liquid crystal material is in the range effective to reflect visible light, both the light reflecting state of FIG. 2 and the light scattering state of FIG. 3, as well as the grey scale states therebetween, are stable in the absence of an electric field. If the multistable material is in the light reflecting state of FIG. 2 and a low electric field pulse is applied, for example, about 6 volts per micron, the material will be driven to the light scattering state of FIG. 3 and will remain in that state at zero field. If the multistable material is in the light scattering state of FIG. 3 and a higher electric field pulse sufficient to untwist the chiral molecules is applied, e.g., about 10 volts per micron of thickness, the liquid crystal molecules will reform to the light reflecting state of FIG. 3 at the end of the pulse and will remain in that condition. It is to be understood that the voltages per micron necessary to drive the material between optical states may vary depending on the composition of the material, but that the determination of necessary voltages is well within the skill in the art in view of the instant disclosure.

If the pitch length of the liquid crystal material is in the range effective to reflect light in the ultra violet range, a variant of multistable cell can be prepared which functions as a bistable light shutter. When the material is in the stable planar texture the cell appears clear because the light reflected from the cell is outside the visible spectrum. As with the color reflecting cells, the material will scatter light when switched to the stable focal conic texture. Hence, the multistable material can be switched between a stable optically clear state, where the liquid crystal reflects light in the ultra violet range, and a stable light scattering state. Pitch lengths effective to reflect light in the ultra violet range will typically be up to about 0.3 microns. Bistable light shutters that reflect light in the ultra violet, and hence appear clear in the planar texture, and scatter light in the focal conic texture have been prepared containing about 18% chiral material based on the combined weight of chiral material and nematic liquid crystal.

If the high electric field necessary to untwist the liquid crystal molecules in the multistable color display materials is maintained, the liquid crystal directors will be homeotropically aligned so that the material is transparent. When the field is quickly removed, the orientation will reform to the light reflecting state of FIG. 2. The intensities of reflectivity reflected between the reflecting state of FIG. 2 and the scattering state of FIG. 3 are stable grey scale reflectivities. Of course, the intensity value of the reflecting and scattering states may vary as the composition of the material varies, but the grey scale is defined by the range of intensities therebetween.

At voltages less than that which will transform the material from the reflecting state of FIG. 2 to the scattering state of FIG. 3, grey scale states which are themselves stable at zero field are obtained. The reflection from the material in these grey scale states is stable because a proportion of the material is in the planar reflecting texture of FIG. 2 and a proportion of the material is in the focal conic scattering texture of FIG. 3.

Thus, for example, if the material is in the reflecting state of FIG. 2 and an electric field pulse is applied having a voltage insufficient to drive all of the liquid crystal 16 into the focal conic texture shown at 50 in FIG. 3, i.e., insufficient to drive the material completely to the scattering state, the material will reflect colored light of an intensity that is proportional to the amount of material that remains in the planar reflecting texture. The reflectivity will thus be lower than that reflected from the material when all of the chiral material is in the planar reflecting texture, but still higher than when switched completely to the focal conic scattering texture. As the voltage of the electric field pulse is increased, more of the chiral material is switched from the planar reflecting texture to the scattering focal conic texture and the reflectivity decreases further until the voltage of the pulse is increased to the point where the material is increased still further, the intensity of reflection begins to increase again until the magnitude of the pulse is sufficient to untwist the chiral molecules so that they will again reform to the planar light reflecting texture when the pulse is removed and the material is again in the light reflecting state of FIG. 2.

If the material is in the focal conic scattering state of FIG. 3, an applied electric field pulse will have a negligible effect on the reflectivity of the cell until it reaches a magnitude sufficient to untwist the chiral material, whereby it will reform to the light reflecting state of FIG. 2, as described above, when the field is removed. The grey scale response of a cell as described above is illustrated in FIG. 4 which shows the response of an exemplary material to varying pulse voltages.

One example of a multistable grey scale display cell may be made from a polymer stabilized chiral nematic liquid crystalline material of the following components;

160.7 mg—CB15 cholesteric liquid crystal, BDH Chemicals 160.7 mg—CE2 cholesteric liquid crystal, BDH Chemicals 488.8 mg—E31 nematic liquid crystal, BDH Chemicals 8.0 mg—BAB (4,4'-bisacryloylbiphenyl), lab synthesized monomer 3.0 mg—BME (benzoinmethyl ether), Polyscience Co., photo-initiator 2.2 mg—R4, dichroic dye A mixture of the liquid crystal and monomer was sandwiched between two glass plates with ITO electrodes. The glass plates were polyimide coated and buffed for homogeneous alignment of the liquid crystal. The back plate was painted black and separated from the front plate by 5 $\mu$m glass fibers. In the reflecting state the cell reflected green color. In the scattering state the cell was black. The filled cell was irradiated with U.V. light for thirty minutes to polymerize the monomer and cause phase separation of the polymer into phase separated polymer domains in the cell.

The reflectivity of the cell in response to an AC pulse of varying voltages was measured. In the measurement, square AC pulses having a width of 10 milliseconds (ms) were used. For this material an applied pulse of about 34V switched the cell completely into the scattering state, independent of whether it was in the reflecting state or the scattering state before the pulse. Minimum reflection is observed here. An applied pulse of about 50V switched the cell into the reflecting state independent of whether the cell was in the scattering or reflecting state prior to the pulse. Maximum reflection is observed here. The transformation from the reflecting to the scattering state was near 0.5 ms. The transformation from the scattering to the reflecting state was near 300 ms.

Figure 4:
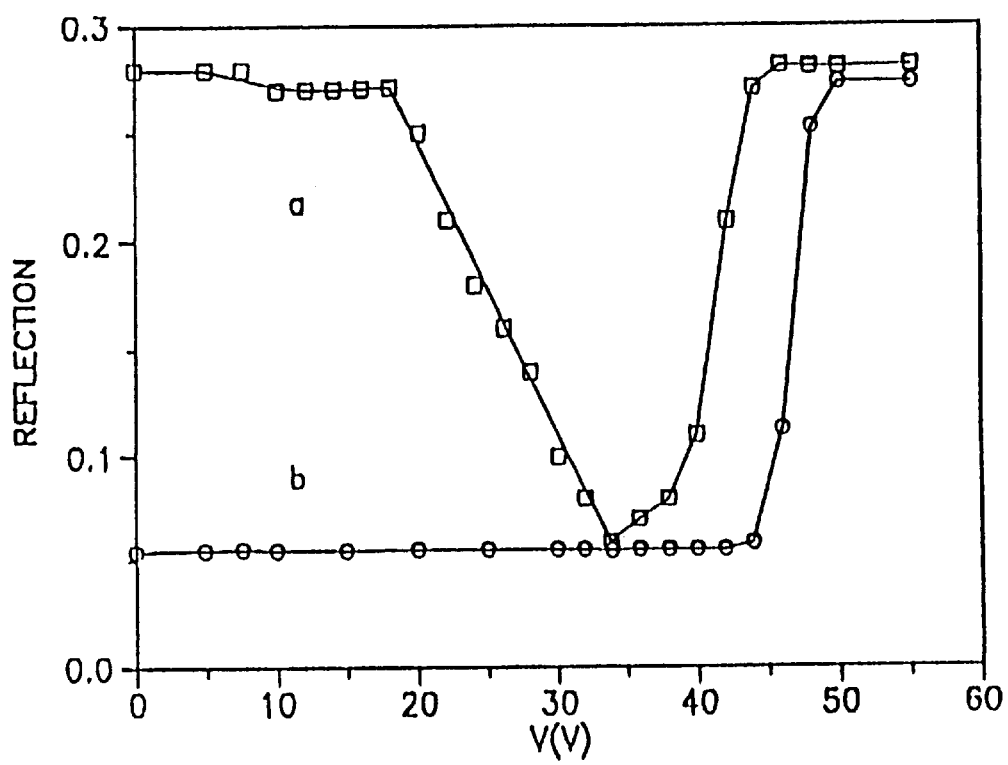
FIG. 4 is a plot of the dynamic response of a cell to AC pulses of varying voltages demonstrating grey scale reflection in the voltage range of about 20 and 34 volts.

The grey scale response of the cell in response to pulses of varying voltage is seen in FIG. 4. Here the voltage of the pulse was varied and the reflection of the cell was measured one second after the pulse. Curve A is the response of the cell when the material is in the reflecting state prior to each pulse. Prior to each pulse platted on Curve A the material was subjected to a high AC pulse of about 50V to ensure that it was completely in the reflecting state prior to the pulse.

When the voltage of the pulse is below 20V, the reflection of the cell is not affected. When the voltage of the pulse is between 20V and 34V, the later being the voltage necessary to switch the cell to the scattering state, the reflectivity of the cell decreases approximately linearly as the voltage of the pulse is increased. Grey scale reflectivity is observed in this voltage range. In each case the material continued to reflect after the pulse was removed. When the voltage of the pulse was increased above 34V, the reflectivity of the cell increased until the reflectivity reached its original value, i.e., that of the reflecting state, above 46V. Curve B is the response of the cell when the material was initially in the scattering state prior to the AC pulse. Here the reflectivity of the cell remains unchanged for an AC pulse below 40V. Above 40V the material switched to the reflecting state.

Pressure Sensitive Writing Tablets

Pressure sensitive pen-addressed writing tablets according to the present invention, which present a marking or writing whenever a mechanical pressure is applied to the surface of a liquid crystal cell, are prepared using a polymer/chiral nematic liquid crystal formulation. The pressure produced during writing changes the liquid crystal material from a transparent focal conic state to a reflecting planar state. The written image is erased by applying either an AC or DC electric field to the cell. Of course, other known means for converting a planar state to a focal conic state may be employed to erase the written image.

Figure 5:
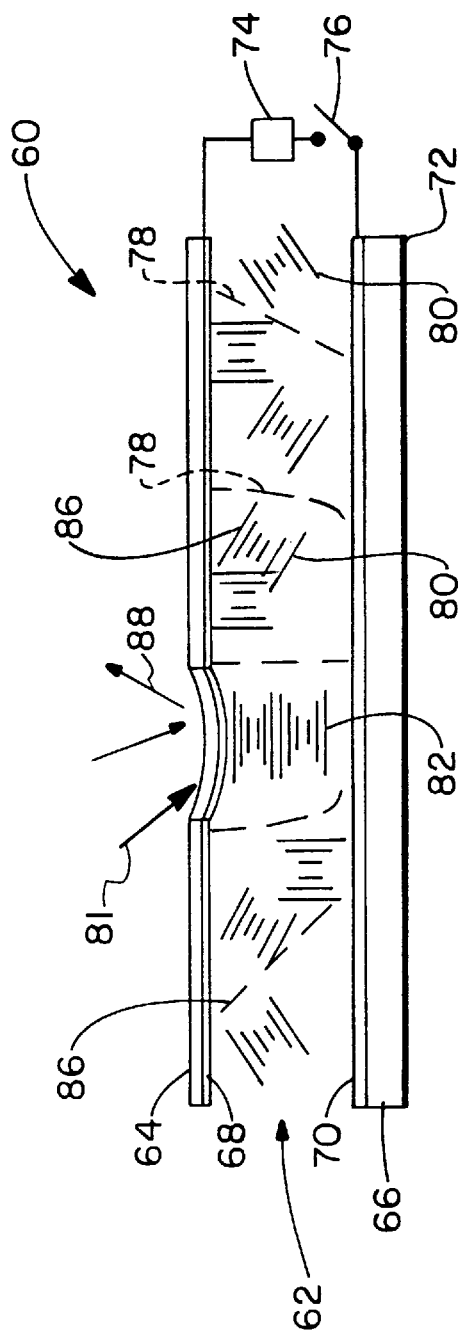
FIG. 5 is diagrammatic, fragmentary, enlarged cross-sectional illustration of the new material when the liquid crystal is employed in a pressure sensitive writing tablet.

As seen in FIG. 5, a pressure sensitive writing tablet according to the present invention is designated generally by the numeral 60. The tablet 60 comprises a polymer/liquid crystal material 62 interposed between two substrates 64 and 66. Generally, the material 62 has a positive dielectric anisotropy and accordingly aligns parallel to an external field. In the preferred embodiment, the substrate 64 is plastic, flexible and transparent and has disposed thereon, facing the material 62, a flexible transparent electrode 68. The substrate 66, which may be either flexible or rigid, transparent or opaque, has disposed thereon, facing the material 62, an electrode 70. Both electrodes 68 and 70 may be made of indium tin oxide. If desired, a back substrate 72 may be disposed on the substrate 66 opposite the electrode 70. The substrate 72 may be black or any other color complementary to the planar state of the material 62.

A power source 74 and a switch 76 are serially connected to the electrodes 68 and 70. Closure of the switch 76 applies an electric field to the tablet 60 for the purpose of aligning the material 62 into a focal conic state. In the preferred embodiment, the power source 74 includes a simple external charge release circuit and a DC driver. Since the tablet 60 is not powered continuously, the power requirements are greatly reduced over other known liquid crystal displays. As such, problems common with traditional liquid crystal displays like ion migration and electrochemical reactions to the electrodes are avoided and a DC field can be used.

The liquid crystal material 62 (specific examples are discussed below) includes polymer cell walls 78 having chiral nematic material disposed therebetween. After application of an electric field by the power source 74, the material 62 contained within each cell is placed in a focal conic state 80. The cell walls 78, which may also be referred to as a polymer network, segment the material 62 into small domains or cells. Upon application of a pressure force by a pen, stylus 81 or any other pressure applying device on the flexible substrate 64, the focal conic state of the cell directly below the stylus 81 changes to a planar state 82.

In use, a relatively low electric field (4.5V/$\mu$m) is applied by the power source 74 and switch 76 perpendicularly to the tablet 60. The material 62 is transformed into a configuration where the helical axes are at random angles to the writing surface of the tablet 60 and appear weakly scattering. In other words, incident light is weakly scattered and transmitted through the material as represented by arrows 86. After removal of the electric field, material 62 remains in the focal conic state 80. If the substrate 72 is black, the tablet 60 appears black. When pressure is applied by the stylus 81 to the substrate 64, the material 62 disposed immediately therebelow switches to the planar state 82 wherein the helical axes are orthogonal to the surface of the tablet 60. As such, the incident light is reflected as represented by arrow 88. The cell walls 78 serve to isolate the pressure applied to only regions directly under the writing stylus 81 and as such generate a high resolution image. The reflected light 88 is of a color determined by the pitch of the liquid crystal formulation. Both the focal conic state 80 and the planar state 82 are stable at zero applied field. As such, the written image appears colored on a complementary or black background.

The resolution of the writing tablet 60 may be enhanced by selectively forming the cell walls 78. In particular, the cell walls 78 may be formed by ultra-violet light exposed through a mask. The monomer within the material 62 migrates to regions of high UV intensity to form the polymer. The liquid crystal material is then isolated within these walls. The formation of defined cell walls reduces the amount of light scattering in exemplary high polymer content formulations, thereby increasing both the brightness and contrast of the resulting device. The cell walls 78 also function to adhere the substrates 64 and 66 to one another.

Another feature of the writing tablet 60 is that the capacitance values associated with the focal conic and planar states of the material 62 may be employed to electronically read the written image. The material 62 typically includes cyanobiphenyl materials which change capacitance by a factor of about two between the planar and focal conic states. Electronic readout may then be achieved by utilizing etched top and bottom electrodes forming rows and columns. The capacitance at each pixel or material contained within an enclosed cell wall 78 is then read by scanning a test voltage across each intersection of the top and bottom electrodes.

Figure 6:
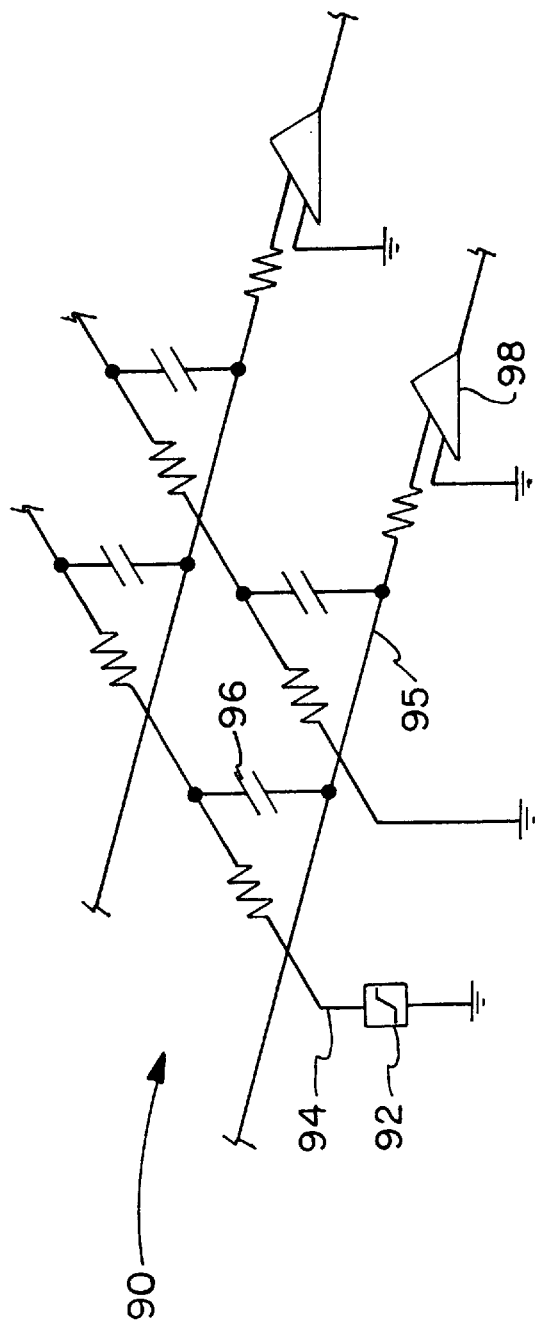
FIG. 6 is a representative circuit for determining the state of a pixel comprising the liquid crystal material of the present invention.

As best seen in FIG. 6, a detection circuit is designated generally by the numeral 90 and includes an input voltage source 92. A row electrode 94, which is connected to the voltage source 92, is disposed adjacent a column electrode 95 passing thereunder to form a capacitor 96. Those skilled in the art will appreciate that the capacitance value of capacitor 96 represents the particular state (focal conic or planar) of the liquid crystal material 62. The capacitance value of the capacitor 96 is detected by an operational amplifier 98 for determining the particular state of a pixel, that is, the state of the material 62 within an enclosed cell wall 78.

Still another feature of the writing tablet is that the patterning of top and bottom electrodes as described above allows for selective areas of the tablet 60 to erased independently of other portions of the tablet. For example, the electrodes can be etched to produce rows where the erase voltage can be independently applied. Accordingly, written material between the preselected rows can be erased as desired.

EXAMPLE 1

An exemplary writing tablet 60 may be prepared with a polymeric/liquid crystal material as follows:

| | |
|---|---|
| Chiral-Nematic Mixture: (85%) | E48,58%: Nematic liquid crystal from EM<br>CB15,21%: Chiral agent from EM<br>CE2,21%: Chiral agent from EM |
| Norland Optical 65: (15%) | UV-curable adhesive polymer from Norland Products, Inc. |

The above mixture was mixed together with a stirrer and produced a light green color. The material was placed in a 70° C. oven and formed a uniform isotropic solution. The thickness of the material was controlled using 4.5 μm plastic ball spacers sprayed on both top and bottom substrates. The heated material was withdrawn from the oven and poured on one substrate, the second substrate was aligned therewith and a roller coater was used to apply 10 psi even pressure, forming a uniform film thickness. Both substrates were a Southwall 7 mil thick polyester coated with 60Ω/square ITO. The cell or tablet was then irradiated with a high-pressure metal halide UV light source for ten minutes. The peak wavelength was 365 nm with an intensity of 25 mw/cm$^2$ in UV B. The excess material was removed from the edges of the cell and the edge was sealed with 5 minute epoxy. The back of the cell was painted black.

| | |
|---|---|
| Process temperature: | 60° C. |
| Drive voltage: | 20 V |
| Color: | Black in focal conic state<br>Green in planar state |

EXAMPLE 2

Another liquid crystal material may be generated by mixing the following materials together.

| | |
|---|---|
| Chiral-Nematic Mixture: (85%) | E48,58%: Nematic liquid crystal from EM<br>CB15,21%: Chiral agent from EM<br>CE4,21%: Chiral agent from EM |
| Norland Optical 65: (15%) | UV-curable adhesive polymer from Norland Products, Inc. |

This sample was formed by a process similar to Example 1, except that a black polyimide coating was disposed on the inner surface of the bottom substrate. The black polyimide coating directly absorbed the light passing through the liquid crystal film, which eliminated the multi-reflection from the bottom substrate and improved the focal conic state (black state). The black polyimide coating also served as a barrier layer reducing top to bottom shorts between the electrodes. Brewer Science PiC DARC 100 Black Polyimide may be used for the coating.

The process steps for applying the black polyimide on a glass substrate are:
(1) Dispense PiC DARC 100 black polyimide on the substrate;
(2) Ramp to 3500 rpm spin for 90 seconds;
(3) Solvent removal bake at about 120° C. for 90 seconds on a hot plate; and
(4) Cure at about 230° C. for about 1 hour in an oven.

The resulting black polyimide coating film is about 0.7 μm to 0.9 μm thick. Glass is used as the bottom substrate and Southwall PET as the top substrate. The rigid bottom substrate improves the resolution of the pen input devices. The bottom substrate may also be a metal, such as aluminum or any other rigid conducting material. The bottom substrate can be either transparent or opaque. If the bottom substrate is non-conductive, a bottom substrate is also required. The absorbing layer can be on the inner or (if the substrate is opaque) outer surface of the bottom substrate or inherent in the substrate.

| | |
|---|---|
| Process temperature: | 35° C. |
| Drive voltage: | 30 V |
| Color: | Black in focal conic state<br>White in planar state |

Based upon the foregoing, the advantages of the writing tablet 60 should be readily apparent. First, the tablet can be made in any size ranging from a small notepad to the entire wall of a class room. The material 62 is instantaneously changeable to allow for normal writing speeds. The tablet 60 can provide any color writing image contrasted by any color background with good contrast and at wide viewing angles. Writing and erasing is easily facilitated and wastes no material as is common with chalk and markers. The writing image is easily erased with a minimal electric field which in turn reduces the amount of power consumed. If desired, the tablet 60 can be configured so that only selected portions thereof are erasable. Erasure requires only a brief tenth of a second erasure pulse. As such, long battery life is attained for portable writing tablets. Still another advantage of the present invention is that the written image can be both read and stored electronically for later evaluation or use.

Many modifications and variations of the invention will be apparent to those skilled in the art in light of the foregoing detailed disclosure. Therefore, within the scope of the appended claims, the invention can be practiced otherwise than as specifically shown and described.

What is claimed is:

1. A light modulating cell, comprising liquid crystalline light modulating material of liquid crystal and polymer, the liquid crystal being a chiral nematic liquid crystal having positive dielectric anisotropy and including chiral material in an amount effective to form a light scattering focal conic texture and a light reflecting planar texture having a pitch length that reflects light in the visible spectrum, the polymer being distributed in phase separated domains in the cell in an amount that stabilizes the thickness and structure of the cell, wherein the application of a mechanical stress to the liquid crystalline light modulating material changes an initial light scattering focal conic texture to the light reflecting planar texture.

2. The cell according to claim 1, wherein the application of an electric field to the cell returns the planar texture to the initial texture.

3. The cell according to claim 1, wherein the chiral nematic liquid crystal contains from about 27 to about 66% chiral material based on the combined weight of nematic liquid crystal and chiral material.

4. The cell according to claim 1, wherein the polymer is present in an amount of from about 1.5 to about 40% based on the total weight of polymer and liquid crystal in the cell.

* * * * *